Jan. 6, 1925.

O. L. WHITEMAN

HOT WATER VALVE

Filed March 3, 1923

1,522,353

WITNESSES

INVENTOR
O. L. WHITEMAN

ATTORNEYS

Patented Jan. 6, 1925.

1,522,353

UNITED STATES PATENT OFFICE.

OWEN L. WHITEMAN, OF COXSACKIE, NEW YORK.

HOT-WATER VALVE.

Application filed March 3, 1923. Serial No. 622,620.

*To all whom it may concern:*

Be it known that I, OWEN L. WHITEMAN, a citizen of the United States, and a resident of Coxsackie, in the county of Greene and State of New York, have invented a new and Improved Hot-Water Valve, of which the following is a full, clear, and exact description.

This invention relates to valves and more particularly to an improved valve known as a hot water valve used in hot water heating systems and has for an object to provide an improved simplified construction wherein very simple and efficient means are used for holding the key of the valve in place and at the same time holding the packing to the valve stem so that it will properly function.

Another object of the invention is to provide a holding or locking nut for the key or sleeve of the valve which in addition, acts as a packing gland.

A still further object of the invention is to provide a valve for hot water heating systems wherein the stem of the valve is threaded and a nut is threaded thereon and onto the casing of the valve simultaneously for locking the parts together while permitting a free movement to the key or sleeve.

A still further object of the invention is to provide an improved construction over my co-pending application, Serial No. 597,664.

In the accompanying drawing—

Figure 1:
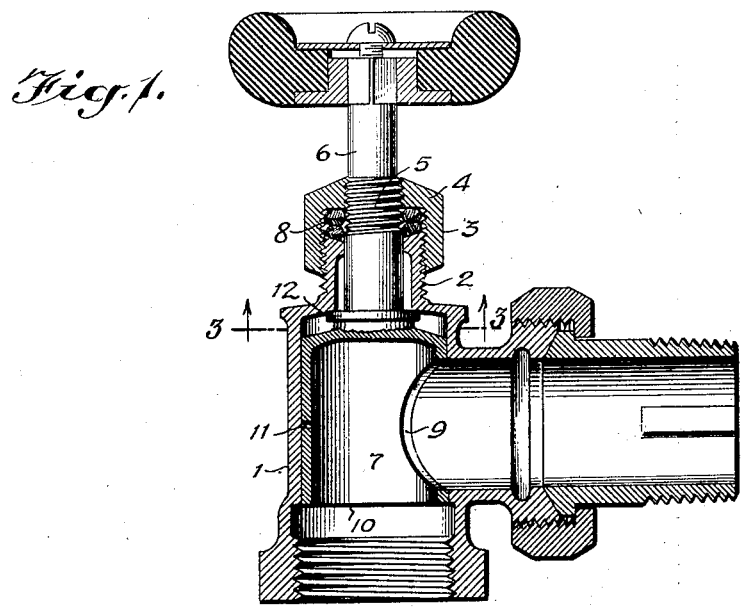
Figure 1 is a longitudinal vertical section through a valve disclosing an embodiment of the invention.
Figure 2:
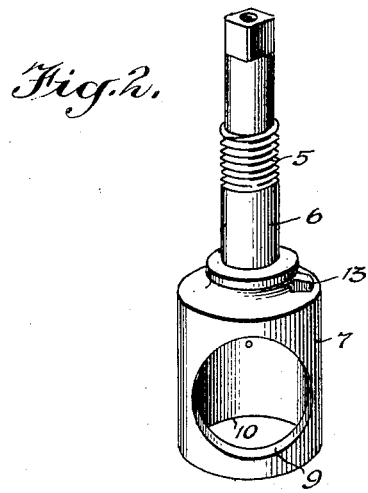
Figure 2 is a perspective view of a key or sleeve of the valve together with its controlling stem.
Figure 3:
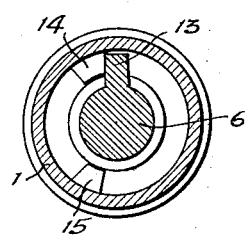
Figure 3 is a fragmentary sectional view through Figure 1 approximately on line 3—3.

In hot water heating systems, difficulty has been found in providing efficient valves which will not drop down or move to an undesirable position during more or less continuous use. In the present construction means have been provided for positively supporting the key while permitting a free turning movement thereto.

Referring to the accompanying drawing by numerals, 1 indicates the casing of a valve which is provided with a hollow stem 2 threaded exteriorly so as to receive the interiorly threaded nut 3, which nut is provided with an annular overhanging inwardly extending flange 4, said flange being threaded with threads of the same pitch as the threads on the stem 2. The threaded flange 4 is screwed onto the threads 5 of the stem 6 and acts as a support for the stem and in fact for the entire key 7 as well as means for compressing the packing 8, which packing co-acts with the upper end of the stem 2 for producing a tight connection between the various parts. The stem 2 and the sleeve or key 7 may be made independent though preferably they are made integral and in the construction of the key a side opening 9 is provided and a bottom opening 10 whereby the water may freely circulate when the valve is open. A bleeding aperture 11 is provided oppoosite opening 9 so that when the valve is closed a very slow circulation of air may be had which is necessary for a proper functioning of the heating system. Near the juncture of the key or sleeve 7 with the stem 6, is a flange 12 and also an enlargement or lug 13, said lug being designed to strike the respective stops 14 and 15 extending from the casing 1 so as to limit the rotary movement of the key to a full opened or full closed position. As the key is moved the threaded section 5 will, of course, rotate and will raise and lower slightly the key but this movement is so small as not to be of any consequence.

Preferably, the parts are arranged so that when the key is fully open, the flange 12 will bear against the upper end of the casing 1 and forming therewith means for preventing the passage of water from the casing into the stem. When the valve is turned for closing, the key will naturally move down a short distance, namely, the distance of the pitch of one thread for half a revolution.

What I claim is:—

A hot water valve, comprising a casing having inlet and outlet openings, and provided with an integral tubular and externally threaded projection on its upper end, a cylindrical valve rotatably mounted in the casing and having inlet and outlet openings and provided with an integral stem projecting through the projection of the casing, said stem being threaded approximately at its center of length and provided adjacent the valve with a flange adapted to seat on the upper end of the casing when the valve is open, coacting stops on the casing and valve for limiting the turning movement of the valve, a flanged and apertured nut having its flange threaded, and the nut being screwed onto the stem of the valve and the flange on the projection of the casing, and a packing between the projection and nut and engaged by the thread of the stem.

OWEN L. WHITEMAN.